SUMMERS & DEMENT.
Wheel Plow.

No. 58,318. Patented Sept. 25, 1866.

Witnesses:

Inventor:

UNITED STATES PATENT OFFICE.

R. B. SUMMERS AND S. DEMENT, OF SAN JOSÉ, ILLINOIS.

IMPROVEMENT IN PLOWS.

Specification forming part of Letters Patent No. 58,318, dated September 25, 1866.

*To all whom it may concern:*

Be it known that we, R. B. SUMMERS and SAMUEL DEMENT, both of San José, Mason county, in the State of Illinois, have invented certain new and useful Improvements in Plows; and we do hereby declare that the following is a full, clear, and exact description thereof, reference being had to the accompanying drawings and to the letters of reference thereon marked, making a part of this specification.

Figure 1:
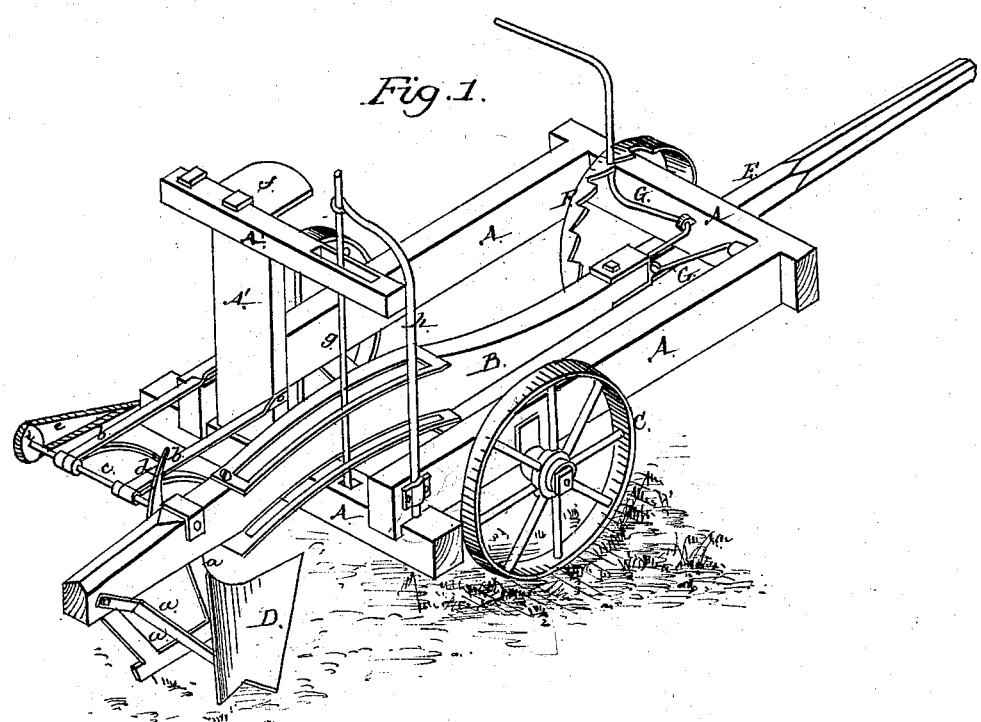
Figure 2:
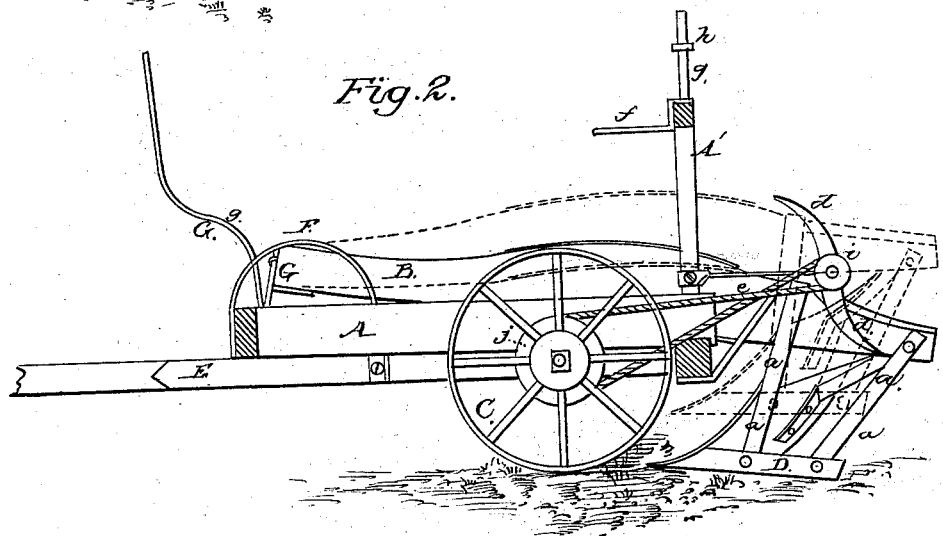

In the drawings, Figure 1 is a perspective view of the machine; Fig. 2, a side elevation of the same.

The nature of our invention consists in attaching a plow to wheels adjustable by means of crank, lever, and ratchet in front of the beam of the plow, and the spring and rod in the rear, for regulating the plow on uneven ground, as hereinafter described.

To enable others skilled in the art to make and use our invention, we will describe its construction and operation.

In the construction of our machine we use any suitable arrangement of land conveyance.

In Fig. 1, A represents the frame, fastened to an axle and pair of wheels, (marked C); B, the plow-beam, to which the plow D is attached by means of braces *a a a*. E is the guide-pole; F, the ratchet, secured to the front piece of the frame and to the pole E by means of screws or bolts; G G, the lever and crank, made of one piece of iron rod, bent to form a crank and lever, combined in this manner: One end of this iron rod is secured in a staple or journal attached to the front piece of frame A. The other end then passes through the device on the end of the plow-beam, and is bent back and passed through a staple or journal secured to the front piece of frame A, thus forming the crank and giving it a U shape. The rod then extends up to a sufficient height to form the lever, whose fulcrum is at the staple or journal. *b b* are arms attached to the back part of the frame to support the shaft *c*, to which the pulley *i* is fixed, over which runs the cross rope or strap *e*. This strap also passes over the pulley *j* (see Fig. 2) on the axle, which communicates motion to the cleaver *d*. *f* is the seat for the driver.

In Fig. 2 the like parts are designated by the same letters as in Fig. 1.

In the operation of our invention we may use two to four horses abreast, attached in any convenient manner to the guide-pole E. The wheels are put in motion, and the plow, of its own weight, enters the ground and is kept in its vertical position by means of the rod and spring and crank. When the lever G is pressed forward to catch in the notch in ratchet F farther in front, the crank part of the lever G is raised nearly vertical. When in this position the plow is intended to plow deep. To decrease the depth, the lever is put back into the next or any required ratchet. The depth to which the plow reaches is thus simply regulated. The lever is under the control of the driver, and can be readily adjusted into any desired notch in the ratchet F while he is on the seat *f*.

The cleaver is put in motion by band, strap, or cord *e*, by means of the pulley *j*, Fig. 2, causing it to revolve rapidly and clear away all substances that would otherwise catch on the colter-bar and choke the plow, and thus cause the plow to rise to the surface. This is the case with gang-plows not having a cleaver.

By means of our cleaver *d* we entirely avoid the choking and raising of the plow.

If the driver wishes to lighten the weight on the wheels in running over rough ground, he can do so by throwing back lever G, thus lowering the plow, and pressing hard on the rod *g*, thereby throwing the weight on the plow, and allowing the wheels to pass lightly over any rough land or substance in the way of the wheels, and it will not push the plow sidewise or affect its depth of furrow.

We find that we can drive four horses abreast without either of the horses walking on the plowed ground. This is a very great advantage, for when the horse walks on the plowed ground he is very much fatigued.

Instead of a gang of plows, we intend using but one plow, and to regulate the land according to the force of the team applied.

If we wish to break prairie sod or other heavily-sodded lands, we can attach a sod-plow and rolling-cutter, by removing two bolts, which fasten braces *a* to the beam, and attaching them in the same manner as the plow represented in the drawings.

Having thus fully described our invention, what we claim as new, and desire to secure by Letters Patent, is as follows:

1. The manner of attaching the beam B to lever and crank G, and raising or lowering the plow D by the lever and crank G and ratchet F, as set forth.

2. The rod $g$ and spring $h$, as described, and for the purposes set forth.

In testimony that we claim the above we hereunto set our hands this 13th day of March, 1866.

R. B. SUMMERS.
    SAMUEL DEMENT.

In presence of—
 ED. CRAIG,
 WM. M. MILLER.